United States Patent [19]

Ozawa et al.

[11] Patent Number: 5,252,901
[45] Date of Patent: Oct. 12, 1993

[54] SYSTEM FOR CONTROLLING LOCOMOTION OF LEGGED WALKING ROBOT

[75] Inventors: Nobuaki Ozawa; Toru Takenaka, both of Saitama, Japan

[73] Assignee: Honda Giken Kogyo Kabushiki Kaisha, Tokyo, Japan

[21] Appl. No.: 800,646

[22] Filed: Nov. 27, 1991

[30] Foreign Application Priority Data

Nov. 30, 1990 [JP] Japan .................. 2-336421

[51] Int. Cl.⁵ .......................................... G05B 19/00
[52] U.S. Cl. ............................ 318/568.12; 318/568.1; 318/625; 180/8.1; 180/8.2; 901/1; 364/424.02; 395/80
[58] Field of Search ........ 318/565, 567, 568.1–568.22, 318/625; 395/88–99; 901/1, 2, 3, 9, 12, 15, 21, 22, 24, 44, 48, 47; 180/8.1–8.6, 167, 169; 414/730

[56] References Cited

U.S. PATENT DOCUMENTS

| | | | |
|---|---|---|---|
| 4,202,423 | 5/1980 | Soto | 180/8.6 |
| 4,408,286 | 10/1983 | Kikuchi et al. | |
| 4,621,332 | 11/1986 | Sugimoto et al. | |
| 4,625,285 | 11/1986 | Mori et al. | |
| 4,641,251 | 2/1987 | Inoue | |
| 4,661,032 | 4/1987 | Arai | |
| 4,712,052 | 12/1987 | Omae et al. | |
| 4,826,392 | 5/1989 | Hayati | 318/625 |
| 4,834,200 | 5/1989 | Kajita | 180/8.1 |
| 4,906,907 | 3/1990 | Tsuchihashi et al. | |
| 4,980,625 | 12/1990 | Shimada | |
| 4,989,161 | 1/1991 | Oaki | |
| 5,005,658 | 4/1991 | Bares et al. | 180/8.1 |
| 5,021,878 | 6/1991 | Lang | |
| 5,040,626 | 8/1991 | Paynter | 180/8.1 |
| 5,151,859 | 9/1992 | Yoshino et al. | 180/8.6 X |

FOREIGN PATENT DOCUMENTS

| | | | |
|---|---|---|---|
| 0406018 | 1/1991 | European Pat. Off. | 180/8.1 |
| 0187671 | 8/1971 | Japan | 180/8.1 |
| 62-97006 | 5/1987 | Japan | |
| 0003581 | 1/1990 | Japan | 180/8.1 |
| 0048282 | 2/1990 | Japan | 180/8.1 |

OTHER PUBLICATIONS

Body Building—copyright 1982 Mark Ford, Produced By Wayne Hurlow And Mark Ford.
Article entitled "Legged Robots on Rough Terrain: Experiments in Adjusting Step Length", by Jessica Hodgins (1988).

*Primary Examiner*—Paul Ip
*Attorney, Agent, or Firm*—Lyon & Lyon

[57] ABSTRACT

A servo system for controlling locomotion of a biped walking robot to follow up a target angle for each drive predetermined in series with respect to time. The control is stabilized by reducing the load on the on-board computer through the provision of an analog circuit for velocity control which has to be carried out in short control cycle and a digital circuit for positional control which can be carried out in relatively long control cycle. For reducing the control deviation to substantially zero, open-loop control is adopted for the motor angular velocity so as to prevent delay from arising in the joint angle control and position feedback control is conducted only in case where a deviation arises between the target joint angle and the actual joint angle owing to external disturbance or the like.

5 Claims, 9 Drawing Sheets

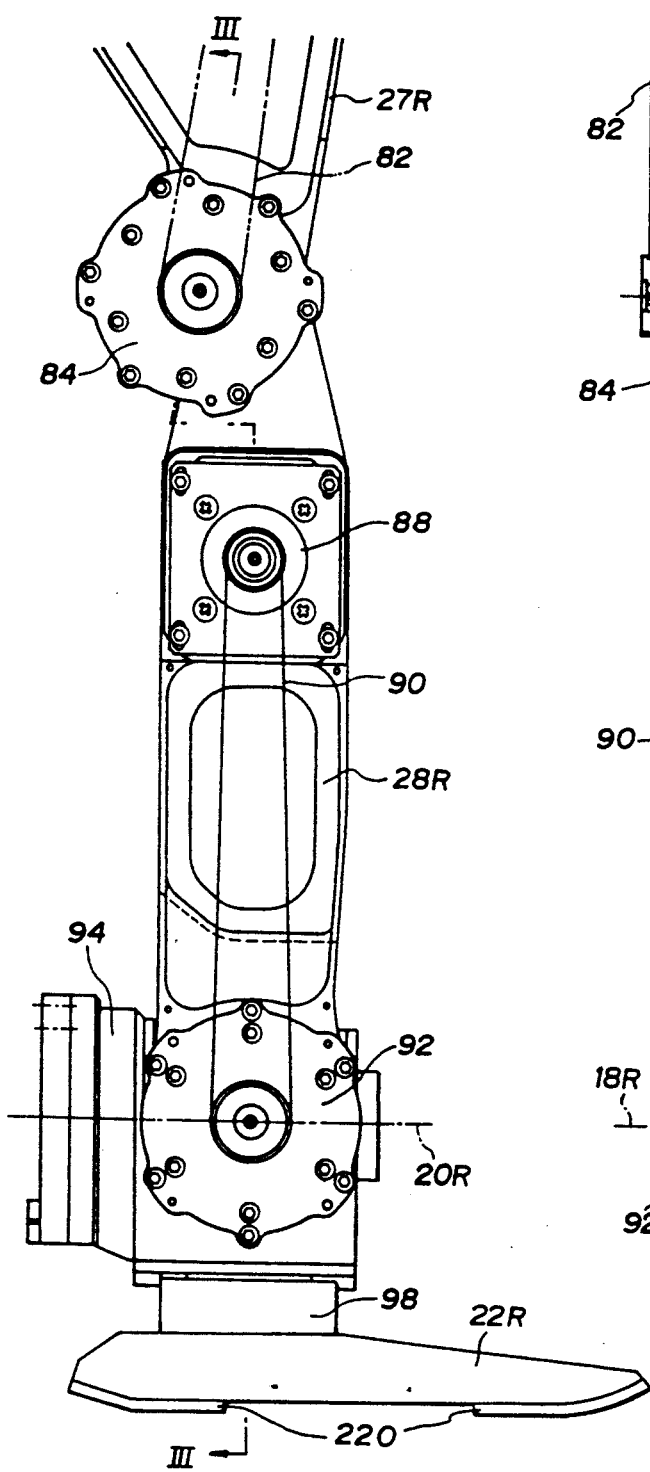
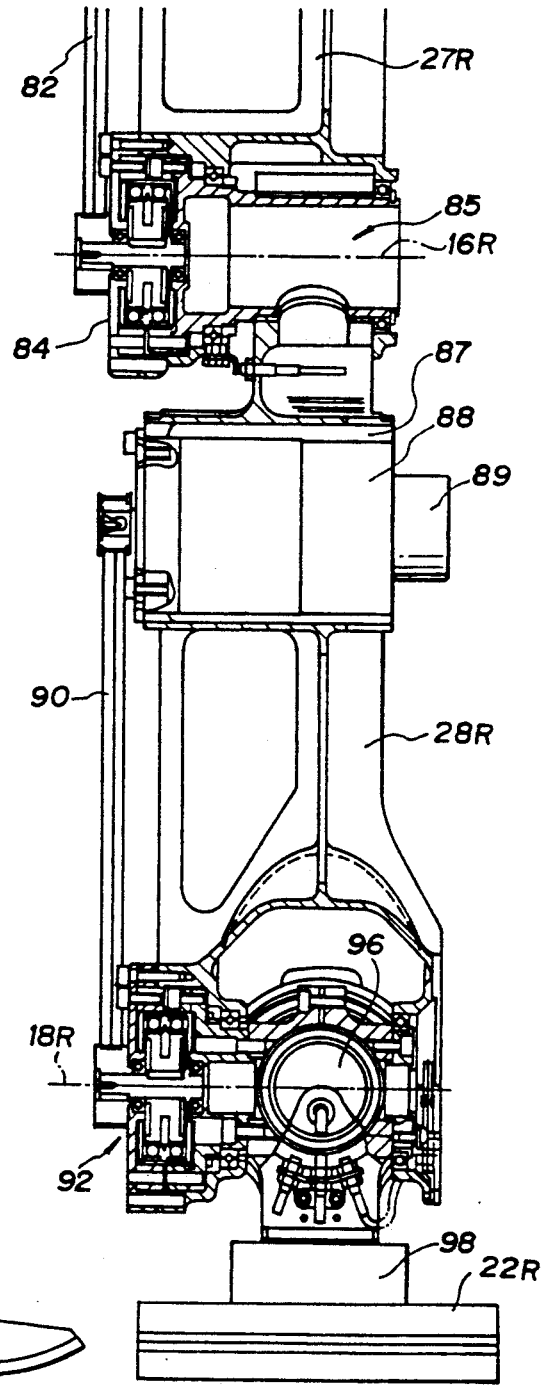

SYSTEM FOR CONTROLLING LOCOMOTION OF LEGGED WALKING ROBOT

BACKGROUND OF THE INVENTION

1. Field of the Invention

This invention relates to a system for controlling the locomotion of a legged walking robot and, more particularly, to a system for controlling the locomotion of a biped walking robot or the like which prevents lag from arising in joint drive control.

2. Description of the Prior Art

A legged walking robot, more specifically a biped walking robot, is disclosed in Japanese Laid-open Patent Publication No. 62-97006. As shown in FIG. 11, the forces acting on the center of gravity G of the robot during walking are a vertical force owing to the robot's weight and an inertial force resulting from acceleration associated with walking, and the resultant of these two forces has to be balanced by an equal an opposite force from the ground. Unless the positioning and timing of foot placement are in accordance with the prescribed walking pattern, this balance cannot be ensured and the robot's locomotion is apt to become unstable.

The conventional way of achieving joint angles faithful to the command values in a legged walking robot has been to use what is known as feedback control. In this type of control, after the angle command value has been applied to the joint drive motor, the resulting actual joint angle is measured by an encoder or the like attached to the motor, whereafter the actual and command values are compared to determine the control deviation and the joint drive motor is operated by an amount to minimize the control deviation. However, for theoretical reasons that explained below, such feedback control inevitably involves some degree of deviation and, moreover, the amount of the deviation differs from one joint to another. The resulting control deviations or lags destabilizes the robot's gait, disturbs the locus of the center of gravity and upsets the locomotion timing, so that the force received from the ground also tends to deviate from the proper magnitude and direction. Stable locomotion thus becomes difficult or impossible. The reason why the deviation leads to control lag will be understood from FIG. 12, which is a block diagram showing the general principle of feedback control. Assuming that the angular velocity command value applied to the motor is constant, the deviation between the encoder detection value $\theta R$ and the command value $\theta COMM$ is multiplied by an appropriate gain kp and the product is input to the motor as a velocity command value omega COMM, causing the motor to rotate by an amount omega R equal to omega COMM. However, owing to the system equilibrium $$\theta COMM - \theta R)kp - omega\ R = 0$$

Therefore $$\theta COMM - \theta R = omega\ R/kp \neq 0$$

and from this it can be seen that a deviation proportional to omega R occurs. FIGS. 13 and 14 show data measured during actual use of this conventional control, FIG. 13 showing the relationship between the command values and the actual joint angles and FIG. 14 showing the corresponding lag. As can be seen from these figures, lag arises when the conventional control is employed.

While one conceivable way of reducing this control deviation is by increasing the feedback gain, this raises the servo rigidity to a higher level than required and is likely to give rise to oscillation. Moreover, since it is necessary from the viewpoint of the practicality of a legged walking robot to take weight, price and power consumption factors into consideration, there is a limit on the performance of the computer that can be installed in the robot. This makes it necessary to solve the problems related to the highly complex control required for locomotion of a walking legged robot by use a relatively low-performance computer. For this, the logic of the motor feedback control has to be simplified as much as possible in order to reduce the load on the computer.

One object of the invention is therefore to provide a system for controlling the locomotion of a legged walking robot which is of simple configuration but is nevertheless able to prevent control deviation and ensure stable walking.

The earlier mentioned Japanese Laid-open Patent Publication No. 62-97006 discloses a control method with excellent possibility of enabling realization of a practicable robot. In this method, the joint angles are calculated offline as a time series in advance and the calculated data is output by an on-board computer during locomotion. Since according to this method data calculated by a computer independent of the robot is stored in the memory of the robot's on-board computer and used during locomotion to control the walking, the on-board computer can be a relatively low-performance machine.

The second object of the invention is therefore to provide a system for controlling the locomotion of a legged walking robot which, in a control method using time series locomotion data calculated offline, is able to prevent control deviation and ensure stable walking in a simpler manner than has been possible heretofore.

SUMMARY OF THE INVENTION

In order to achieve the objects the present invention provides a system for controlling locomotion of a legged walking robot having a body link and a plurality of leg linkages each connected to a body link by a first drive joint and each including at least one second drive joint connecting an upper link and a lower link. Said system comprises a servo motor for driving the joint, first means for outputting a command value on speed to drive the servo motor in responsive with a change rate of a target angle, and second means for calculating a deviation in a digital value between the target angle and a real joint angle and for carrying feedback compensation on the command value in responsive with the deviation and a gain to be multiplied thereto.

BRIEF EXPLANATION OF THE DRAWINGS

These and other objects and advantages of the invention will be more apparent from the following description and drawings, in which:

FIG. 2 is a side view and shows the concrete arrangement from the knee on down of the robot illustrated schematically in FIG. 1;

FIG. 3 is a sectional view taken along line III—III of FIG. 2;

DETAILED DESCRIPTION OF THE INVENTION

Figure 1:
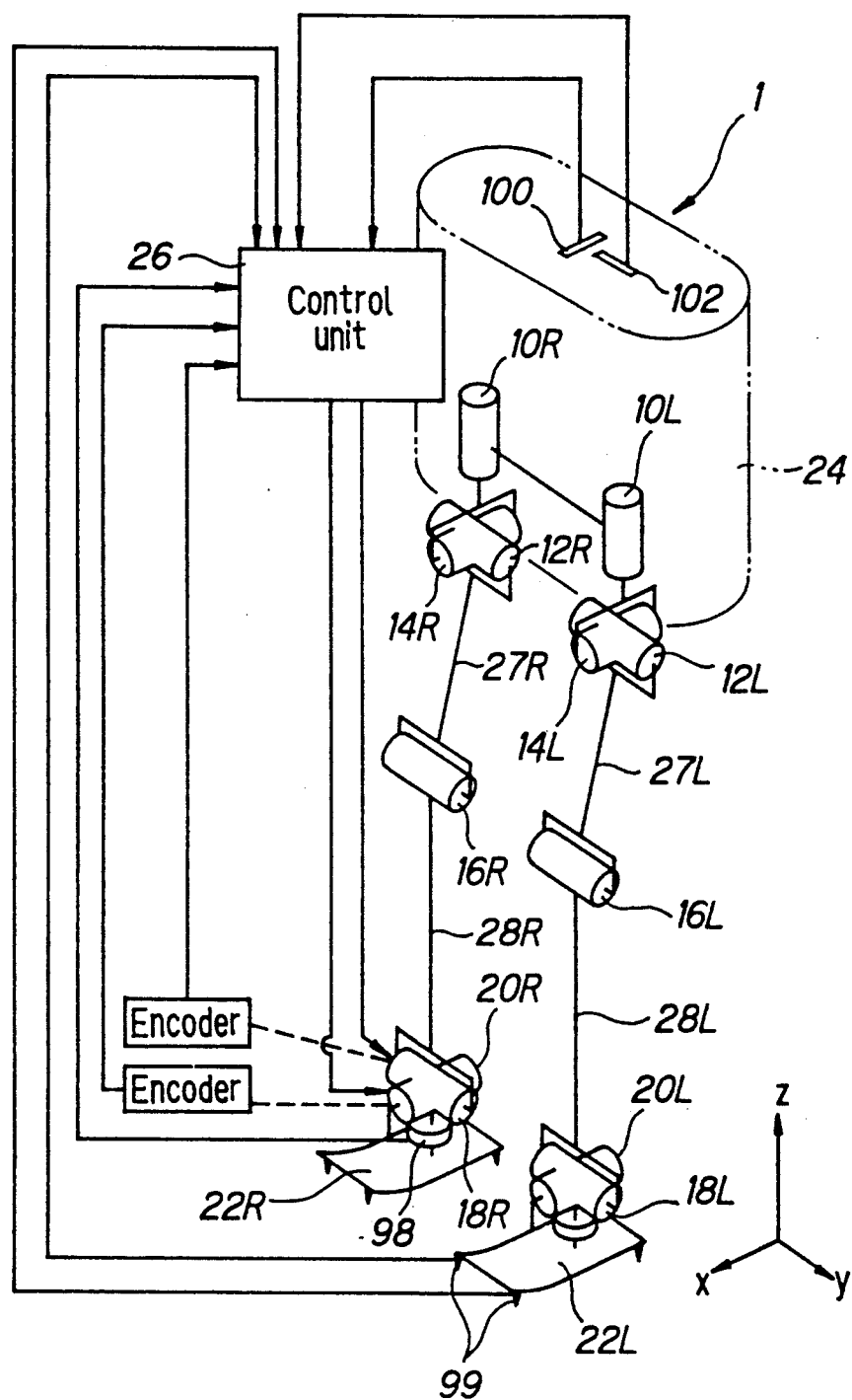
FIG. 1 is an overall skeleton view of a biped walking robot according to the present invention.

The invention will now be explained with reference to a biped walking robot as a specific embodiment of a legged walking robot. An overall skeleton view of the biped walking robot is shown in FIG. 1. The robot, designated by reference numeral 1, is provided with six joints (axes) on each of its right (R) and left (L) legs. From the top down, these joints (axes) are hip turning joints (axes) 10R, 10L, hip pitch direction joints (axes) 12R, 12L, hip roll direction joints (axes) 14R, 14L, knee pitch direction joints (axes) 16R, 16L, ankle pitch direction joints (axes) 18R, 18L, and ankle roll direction joints (axes) 20R, 20L. The pitch direction is the direction indicated by "x" and the roll direction is the direction indicated by "y" as shown in the right bottom of the figure. Feet 22R, 22L are attached below and a body (main unit) 24 is disposed at the uppermost position. The body 24 houses a control unit 26.

In this arrangement, joints (axes) 10R (L), 12R (L) and 14R (L) together constitute a right (left) hip joint. The three axes meet at a single point. The joints (axes) 18R (L) and 20R (L) together form a right (left) ankle, wherein these two axes also intersect perpendicularly. The three pitch direction joints (axes) 12R (L), 16R (L) and 18R (L) are mutually parallel and the positional relationship thereamong remains unchanged irrespective of the behavior of the other joints (axes). As illustrated, each leg has six degrees of freedom and each foot 22R (L) can be placed at the desired position in the desired direction irrespective of the fact that it is attached to the body 24. Specifically, during walking the legs as a whole can be moved as desired by appropriately driving the 12 (6×2) joints (axes) for varying their individual angles, thus enabling desired walking in three-dimensional space. The hip joints and the knee joints are connected by thigh linkages 27R, 27L and the knee joints and ankle joints are connected by crus linkages 28R, 28L.

The joints are constituted mainly of motors and reduction gear mechanisms. The arrangement of the knee will now be explained in detail with reference to FIGS. 2 and 3. Although a detailed description of the hip joints will not be given, it should be understood that they are of a similar structure to the knees. As the left and right legs are laterally symmetrical, only the right leg will be explained in the following.

Referring to FIGS. 2 and 3 the output of a motor (not shown) mounted at an intermediate portion of the thigh linkage 27R is transmitted via a belt 82 to the input shaft of a harmonic reduction gear 84 installed at the knee joint (axis) 16R. The upper end of the crus linkage 28R is formed with a recess 87 which accommodates a motor 88, the output of which is input through a belt 90 to a harmonic reduction gear 92 provided at the ankle, whereby the right foot member 22R is driven in the pitch direction about the axis 18R. The foot 22R is further arranged to swing freely in the roll direction about the axis 20R perpendicularly intersecting the axis 18R. For this purpose, there is provided a harmonic reduction gear 94 and a motor 96 for supplying power directly thereto. Each of the motors is provided with a rotary encoder. (Only the rotary encoder 89 for the motor 88 is shown in the drawings.)

The ankle is further provided with a six-dimensional force and torque sensor 98 for measuring the x, y and z components transmitted to the robot through the foot and also separately measuring the three directional components of the moment, so as to detect whether or not the foot has landed and the force acting on the supporting leg. The bottom of the foot is approximately flat and is provided with elastic members 220 made of rubber or the like for absorbing the impact received at time the foot touches down. The four corners of the foot bottom are further provided with ground contact switches 99 (not shown in FIGS. 2 and 3) of conventional design for detecting contact between the foot and ground. Further, as shown in FIG. 1, a pair of inclination angle sensors 100, 102 are provided at an appropriate location on the body 24 for detecting (a) the amount of angle and angular velocity of the inclination relative to the z-axis in the x-z plane and (b) the amount of angle and angular velocity of the inclination relative to the z-axis in the y-z plane. The outputs of the inclination angle sensors 100, 102 are sent to the control unit 26 housed in the body 24.

Figure 4:
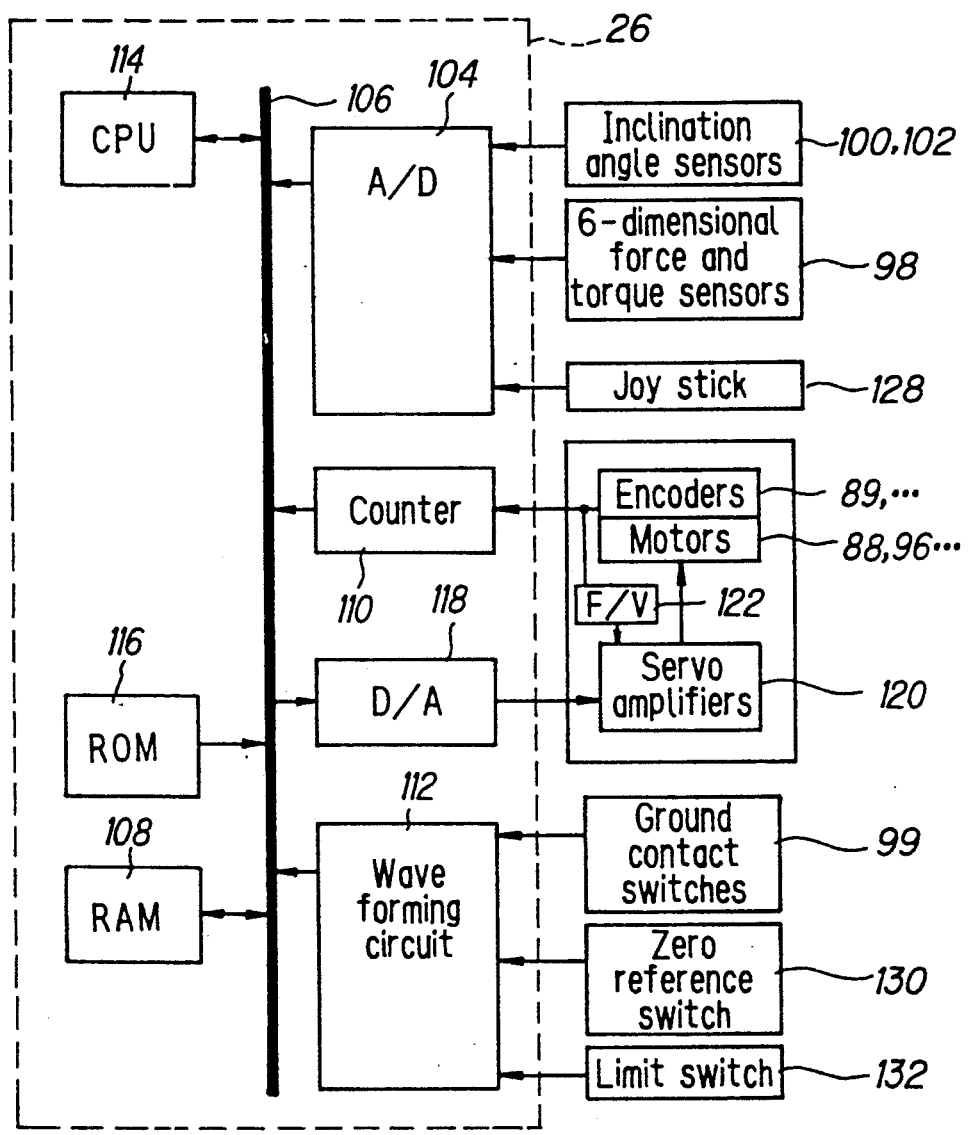
FIG. 4 is a detailed block diagram of the control unit shown in FIG. 1.

As shown in the detailed block diagram of FIG. 4, the control unit 26 is constituted as a microcomputer. Here the outputs of the inclination angle sensors 100, 102 etc. are converted to digital values in an A/D converter 104, the output of which is forwarded to a RAM (random access memory) 108 via a bus 106. The outputs of the encoder 89 etc. are sent to the RAM 108 through a counter 110 and the outputs of the ground contact switches 99 etc. are passed through a wave forming circuit 112 and stored in the RAM 108. The control unit has a CPU (central processing unit) 114 which, in the manner to be explained later, reads in the stored locomotion data, calculates speed control commands on the basis of the deviation between the stored locomotion data and measured values received from the counter 110, and forwards the calculated speed control commands through a D/A converter 118 to a servo amplifier 120 for respective motor. The encoder output is further sent through an F/V converter 122 to the servo amplifier 120, whereby a minor loop for speed feedback control is established in each motor. Reference numeral 128 designates a joy stick, 130 a zero reference switch for determining the origin (upright) posture, and 132 a limit switch for preventing overrun.

Figure 5:
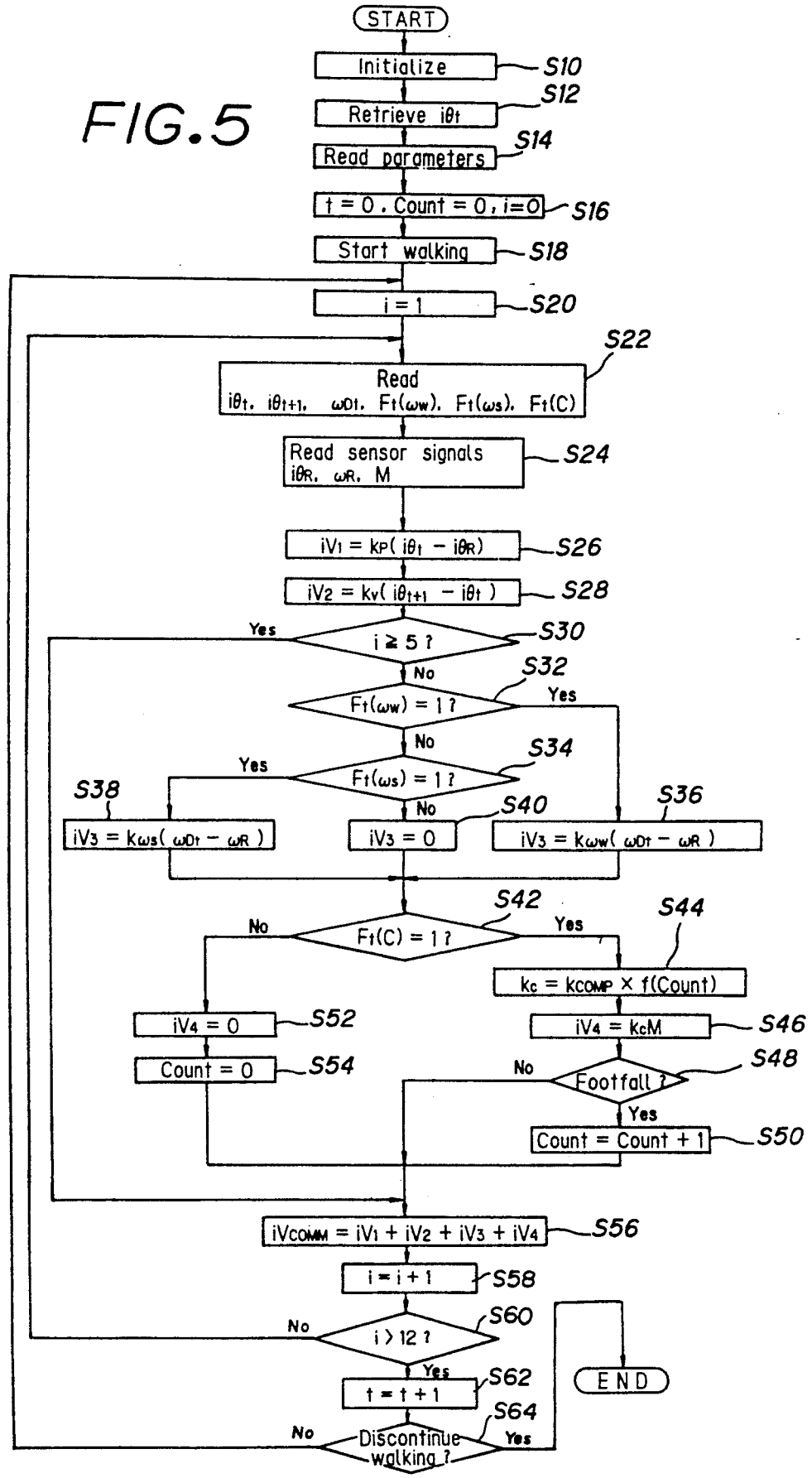
FIG. 5 is a flowchart showing the operation of the control unit of FIG. 4.

The operation of the control system will now be explained with reference to the flowchart of FIG. 5. The control shown in this figure assumes offline setting of the target joint angles in advance and the use of virtual compliance control technique, referred in "Virtual compliance control of multi-degree-of-freedom robots" in collected papers of the Measurement and Automatic Control Society, Vol. 22. No. 3, March 1986.

The operation commences with step S10 in which the various sections of the system are initialized and then moves to step S12 where a locomotion pattern i$\theta$t is retrieved. This pattern indicates the joint angle target values for walking of the robot over an ideal flat surface of uniform hardness. The prefix "i" indicates the joint number and the suffix "t" indicates the joint angle at time "t". The joints are numbered from the bottom up as 20R=1, 20L=2, ... These time series data are calculated in advance using a large computer and stored in a ROM 116 of the microcomputer.

The procedure then advances to step S14 in which the parameters kp, kv ... are read in. These are feedback gains which will be explained in detail later. In the following step S16 the timer value t, the counter value COUNT and the joint number (counter) value i are reset to zero, whereafter walking is started in step S18 and the value of the counter for counting the joint numbers is set to 1 at step S20. The operation then advances to step S22 in which the parameters for the joint angle i$\theta$t (i=1) etc. corresponding to the currently set joint number are retrieved from memory. The notation i$\theta$t+1 appearing in the flowchart indicates the target joint angle for the time t+1 following the current time t, namely for time at which the next program cycle begins. A value omega Dt indicates the target angular velocity (to be explained later). And Ft(omega w) is a flag which indicates the two-leg support period, Ft(omega s) a flag indicating the one-leg support period, and Ft(C) a flag indicating the impact absorption control period. The microcomputer determines when the procedure is in this period on the basis of the outputs from the respective six-dimensional force and torque sensor 98 and the like and sets the flag bit to 1 at this time.

Figure 6:
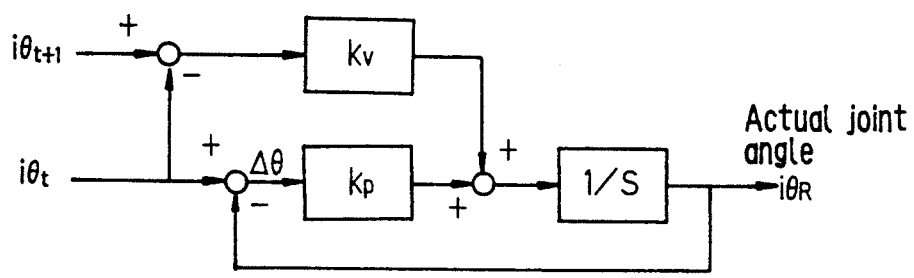
FIG. 6 is a block diagram showing control algorithm on drive joints other than ankle joints carried out in procedures in the flowchart of FIG. 5.

Next, in step S24, the outputs of the inclination sensors etc. are read in. Here a value i$\theta$R indicates the actual angle of the i-th joint, omega R the actual inclination angular velocity, and M the actual moment acting on the foot. The operation then advances to step S26 in which the position feedback control value iV1 is calculated and to step S28 in which the speed feedback (forward) control value iV2 is calculated. In other words, as shown in FIG. 6, in the control system according to the invention there is output to the servo amplifier 120 concerned a speed control value equal to the sum of a feedback value obtained by multiplying the deviation delta $\theta$ between the joint angle command value i$\theta$t and the actual joint angle i$\theta$R by a proportional gain kp and a feedback value obtained by multiplying the deviation between the joint angle command value i$\theta$t at time t and the joint angle command value i$\theta$t+1 at time t+1 by a gain kv. It should be noted, however, that the block diagram of FIG. 6 relates to the joints other than the ankle joints and that, as shown in the block diagram of FIG. 7, in the case of the ankle joints there are also fed back control values based on compliance control and the like. This will be explained in more detail later.

Figure 7:
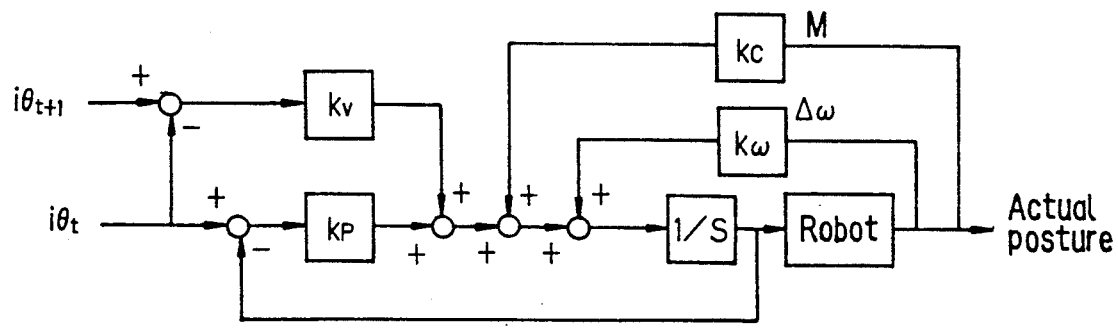
FIG. 7 is a block diagram similar to FIG. 6, but shows control algorithm on the ankle joints.

The operation then advances to step S30 in which discrimination is made as to whether or not the joint number has become 5 or greater, namely as to whether or not the control value of other than the ankle joints is in the process of being calculated, and since the result is of course negative, the procedure moves onto step S32 and the ensuing steps in which, first, inclination angular velocity feedback and the like are carried out. Specifically, in steps S32 to S34 it is discriminated whether the flag Ft(omega w) or flag Ft(omega s) is on (whether the robot is in a two-leg support state or a one-leg support state) and, based on the result of this discrimination, the procedure advances to step S36 or S38 in which a third speed feedback control value iV3 is calculated, as shown in FIG. 7, by multiplying the deviation delta omega between the target inclination angular velocity omega Dt and the actual inclination angular velocity omega R by gain k omega. Simply stated, what this means it that the control system implements stability control with respect to the ankle joints of the supporting leg for preventing the robot from toppling when it has been judged that the inclination angular velocity deviates from the target value or that an external moment is acting on the ankle joints. Specifically, on such occasions the control system drives the ankle joints of the supporting leg in accordance with the degree of deviation in order to produce a reactive force with respect to the ground and thus correct the robot's attitude as required to prevent the robot from falling over. The k omega is defined differently during the two-leg support period and during the one-leg support period. Moreover, in the procedure according to the flowchart of FIG. 5, when it is found that the robot is in neither the two-leg support state nor the one-leg support state, the control value in step S40 is zero.

The operation then moves to step S42 in which the virtual compliance control value is determined. Specifically, a prescribed period TCOMP between footlift (the event of lifting a foot) and footfall of the robot's free leg is defined as the impact absorption control period Ft(C), and when it is judged in step S42 that the operation has entered this period, the procedure advances to step S44 in which the gain kc is calculated as kc=kCOMP×f-(COUNT), to step S46 in which a fourth speed feedback value iV4 is calculated by multiplying kc by the detected moment M (as shown in FIG. 7), and then, after detection of footfall in step S48, to step 50 in which the counter value is incremented. In other words, the impact absorption gain is established as a function of the count value COUNT and from the time of footfall this gain is progressively diminished to zero over the course of time. When it is found in step S42 that the operation is not in the impact absorption period, the procedure goes to step S52 in which the control value iV4 is set to zero and then to step S54 in which the counter value is reset to zero.

Next, in step S56, all of the calculated control values are added together to obtain a sum iVCOMM which is output to the servo amplifiers 120 for the motor concerned, whereafter the joint number counter is incremented in step S58, discrimination is conducted in step S60 as to whether this is the last joint and, if it is, the timer value t is incremented for retrieval of the next target joint angle in step S62 and, so long as it is not found in step 64 that walking is to be discontinued, control values are continuously determined for the respective joints.

As will be understood from the foregoing, in this embodiment stability is ensured by the use of an analog circuit for velocity control, which has to be conducted in short control cycles, while the load on the computer is reduced by using a digital circuit only for positional control, which can be conducted in relatively long control cycles. Further, for reducing the control deviation to substantially zero, feed forward control is adopted for the motor angular velocity so as to prevent delay from arising in the joint angle control and position feedback control is conducted only in cases where a deviation arises between the target joint angle and the actual joint angle owing to external disturbance or the like.

Figure 8:
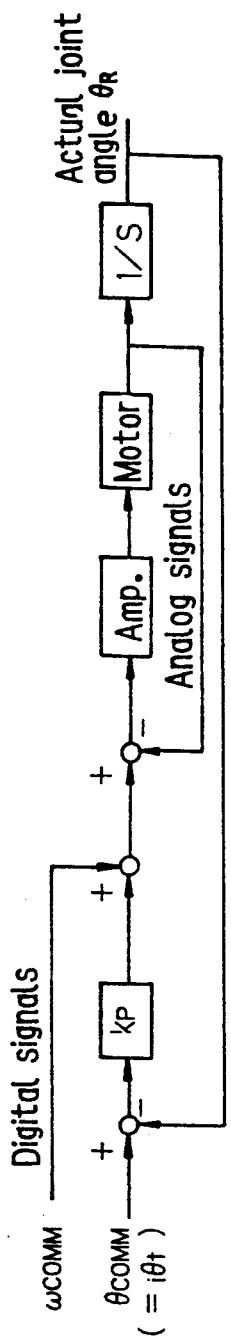
FIG. 8 is a block diagram showing the characteristic feature of control algorithm according to the present invention.

Specifically, as shown in FIG. 8, the control is stabilized by reducing the load on the on-board computer through the provision of an analog circuit for velocity control, which has to be carried out in short control cycles, and a digital circuit for positional control, which can be carried out in relatively long control cycles. Further, for reducing the control deviation to substantially zero, open-loop control is adopted for the motor angular velocity so as to prevent delay from arising in the joint angle control and position feedback control is conducted only in cases where a deviation arises between the target joint angle and the actual joint angle owing to external disturbance or the like.

Figure 9:
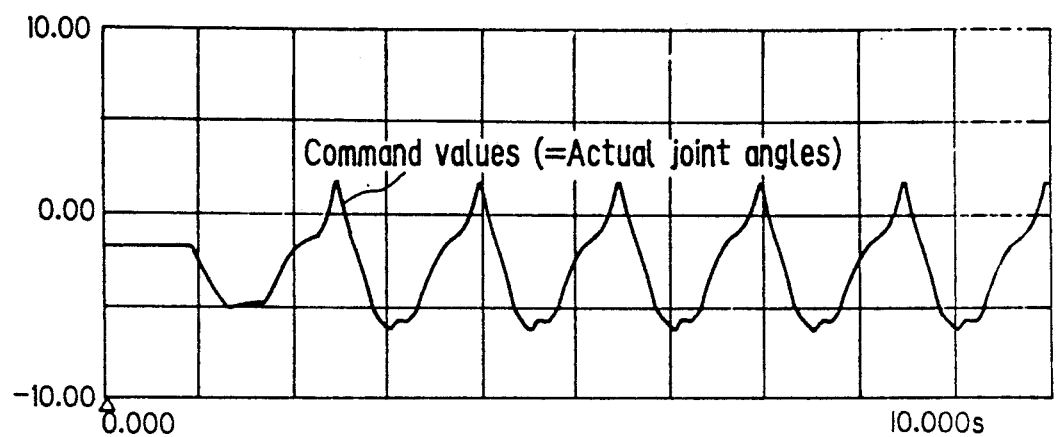
FIG. 9 is a data showing relationship between command values and actual joint angles in the control according to the present invention.
Figure 10:
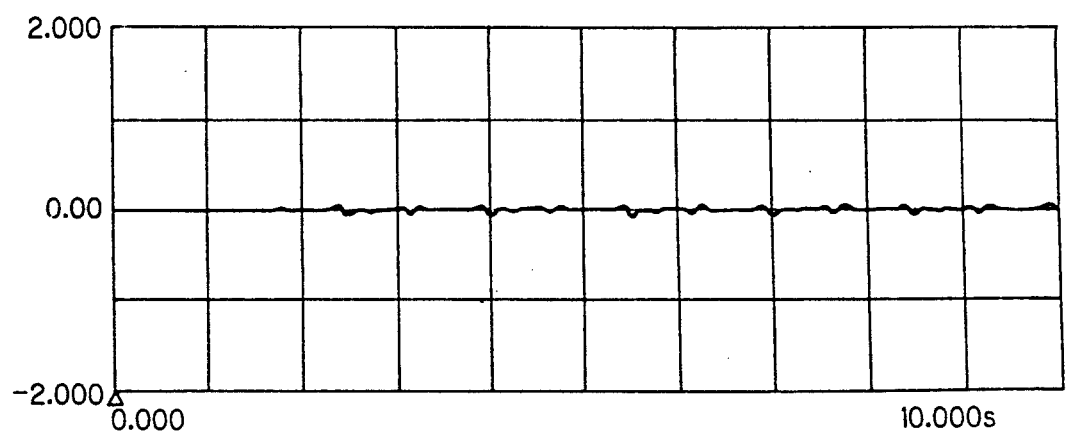
FIG. 10 is a data showing the lag between the values illustrated in FIG. 9.
Figure 11:
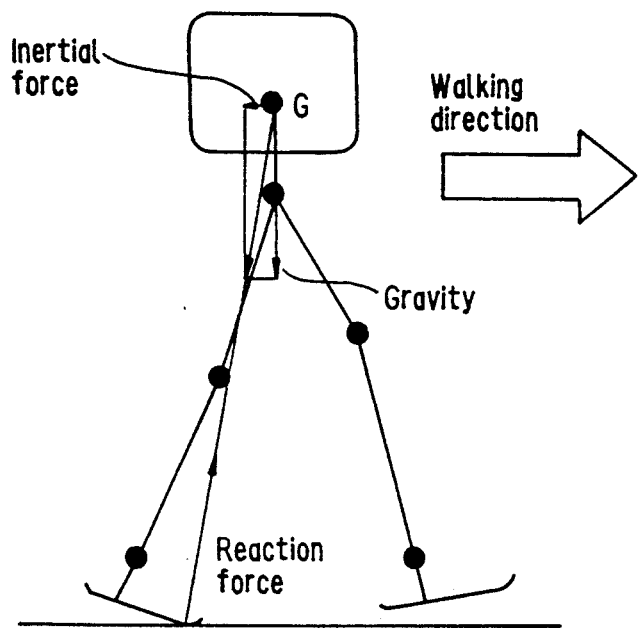
FIG. 11 is an explanatory view showing various forces acting on a biped walking robot when it walks.
Figure 12:
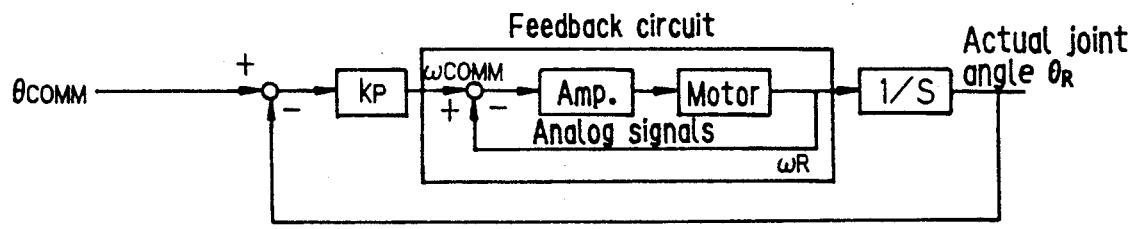
FIG. 12 is a block diagram similar to FIG. 8, but shows control algorithm according to the prior art.
Figure 13:
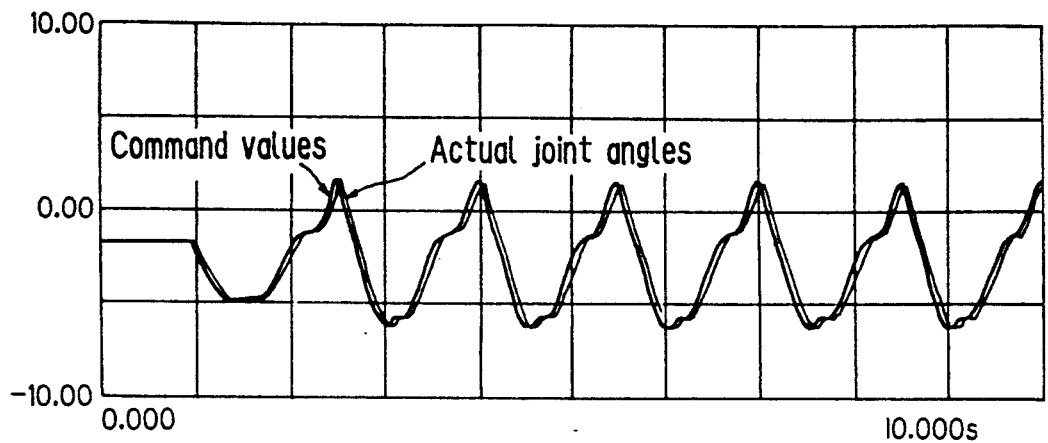
FIG. 13 is a data similar to FIG. 9, but shows the relationship between the command values and actual angles in the prior art control illustrated in FIG. 12.
Figure 14:
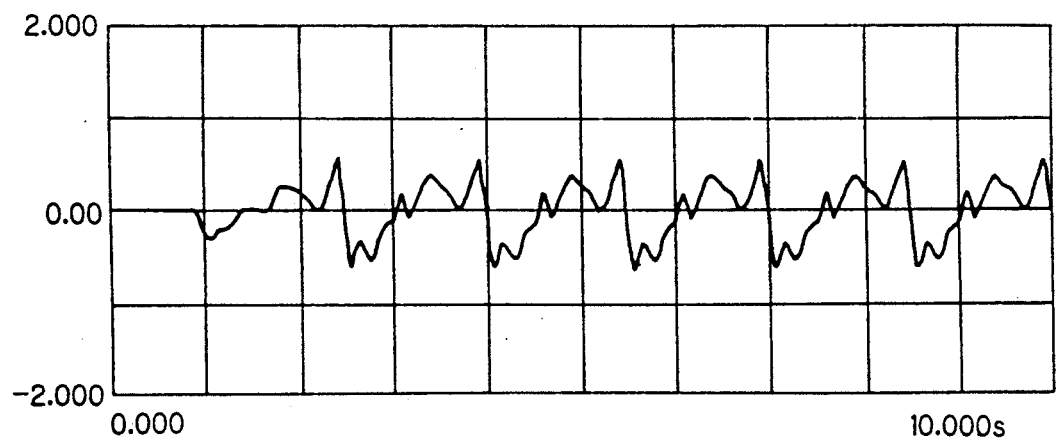
FIG. 14 is a data similar to FIG. 10 but shows the lag between the values illustrated in FIG. 13.

FIG. 9 shows the relationship between the command values and the actual joint angles when the control system of the invention was used and FIG. 10 shows the corresponding lag. A comparison of these results with the results of conventional control indicated in FIGS. 13 and 14 shows that the control system of the invention substantially eliminates control deviation.

Also, since the system according to the invention uses target joint angles calculated offline in advance, it greatly reduces the load on the on-board computer, while the fact that the difference between the current command value and the command value for the next cycle is used as the velocity command value, makes an even further simplification of the control system possible.

In addition, while the invention was described with respect to a biped walking robot, it is applicable not only to such robots but also to robots having three or more legs.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling the locomotion of a legged walking robot having a body link and a plurality of leg linkages each connected to the body link by a first drive joint and each including at least a second drive joint connecting an upper link and a lower link thereof, comprising:
    a servo motor for driving the individual joints;
    first digital closed-loop positional control means for calculating a deviation between a target joint angle and a real joint angle and for multiplying the deviation by a gain to determine a first velocity command to be applied to an inner analog velocity closed loop; and
    second digital open-loop velocity control means for outputting a second velocity command to be added to the first velocity command in response to a change rate of the target joint angle.

2. A system according to claim 1, wherein the target joint angle is predetermined in series with respect to time and said second digital open-loop velocity control means determines the second velocity command based on a deviation between target joint angles at a time t and at a time t+1.

3. A system according to claim 1 or 2, wherein the robot is a biped walking robot.

4. A controller of a servo motor for a robotic joint, comprising:
    a digital positional closed-loop for determining a velocity command to be applied to an inner analog velocity closed loop, by multiplying a deviation between a target joint angle and an actual joint angle by a gain; and
    a digital velocity open-loop for determining a second velocity command to be added to the first velocity command from a time derivative of the target joint angle multiplied by a gain.

5. The controller according to claim 4, wherein the time derivative is a value between the joint target angles at a time t and at a time t+1.

* * * * *